United States Patent
Han et al.

(10) Patent No.: US 11,991,573 B2
(45) Date of Patent: May 21, 2024

(54) CELL HANDOVER METHOD AND DEVICE, AND USER PROCESSING METHOD AND DEVICE

(71) Applicant: ZTE CORPORATION, Guangdong (CN)

(72) Inventors: Jiren Han, Guangdong (CN); Zhuang Liu, Guangdong (CN); Yin Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 411 days.

(21) Appl. No.: 17/427,871

(22) PCT Filed: Jan. 22, 2020

(86) PCT No.: PCT/CN2020/073773
§ 371 (c)(1),
(2) Date: Aug. 2, 2021

(87) PCT Pub. No.: WO2020/156424
PCT Pub. Date: Aug. 6, 2020

(65) Prior Publication Data
US 2022/0124579 A1     Apr. 21, 2022

(30) Foreign Application Priority Data

Feb. 3, 2019     (CN) .......................... 201910108600.2

(51) Int. Cl.
*H04W 36/00*     (2009.01)
(52) U.S. Cl.
CPC . *H04W 36/00837* (2018.08); *H04W 36/0009* (2018.08); *H04W 36/0033* (2013.01)

(58) Field of Classification Search
CPC ............ H04W 12/08; H04W 36/0009; H04W 36/0033; H04W 36/0058; H04W 36/00837; H04W 8/186
(Continued)

(56) References Cited

U.S. PATENT DOCUMENTS

2010/0238858 A1   9/2010   Kim et al.
2015/0319665 A1   11/2015  Bonneville et al.
(Continued)

FOREIGN PATENT DOCUMENTS

CN     102026356 A    4/2011
CN     102131258 A    7/2011
(Continued)

OTHER PUBLICATIONS

China Patent Office, First Office Action dated Jul. 13, 2022, for corresponding Chinese application 201910108600.2.

(Continued)

*Primary Examiner* — Robert J Lopata
(74) *Attorney, Agent, or Firm* — Li & Cai Intellectual Property (USA) Office

(57) ABSTRACT

A cell handover method, a cell handover device, a user processing method and a user processing device are disclosed. The cell handover method includes receiving a trigger message sent by a User Equipment (UE), and sending a UE context setup request, which is configured to instruct a target distributed network element to set up a UE context, to the target distributed network element in response to the trigger message.

21 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0105128 A1 | 4/2017 | Chiba et al. | |
| 2018/0332516 A1 | 11/2018 | Oak et al. | |
| 2019/0069333 A1* | 2/2019 | Kim .................. | H04W 36/0033 |
| 2020/0396663 A1* | 12/2020 | Byun ................ | H04W 36/0072 |
| 2022/0132626 A1* | 4/2022 | Xu .................... | H04W 76/11 |

FOREIGN PATENT DOCUMENTS

| | | |
|---|---|---|
| CN | 102202365 A | 9/2011 |
| CN | 102301753 A | 12/2011 |
| CN | 102396260 A | 3/2012 |
| CN | 102905328 A | 1/2013 |
| CN | 104641690 A | 5/2015 |
| CN | 106416373 A | 2/2017 |
| CN | 107548119 A | 1/2018 |
| CN | 108024314 A | 5/2018 |
| CN | 108810968 A | 11/2018 |
| CN | 109246746 A | 1/2019 |
| EP | 3131341 A1 | 2/2017 |
| WO | WO2012171394 A1 | 12/2012 |
| WO | WO2013093748 A1 | 6/2013 |
| WO | WO2013143908 A1 | 10/2013 |
| WO | WO20150144253 A1 | 10/2015 |
| WO | WO20180164469 A1 | 9/2018 |
| WO | WO-2020153807 A1 * | 7/2020 |

OTHER PUBLICATIONS

Ericsson, "Xn handover in disaggregated gNB", 3GPP TSG-RAN WG3 AH #2, Jun. 29, 2017.
China Telecom, "Motivation for new SI Proposal on CSG support for NR", 3GPP TSG RAN Meeting#82 RP-18233, Dec. 10, 2018.
ZTE, et al., "New Work Item Proposal on CAG support for NR", 3GPP TSG RAN Meeting#82 RP-182795, Dec. 10, 2018.
"Study on enhancement of 5GS for Vertical and LAN Services," 3GPP TR 23.734V16.0.0(Feb. 2018), Dec. 2018.
European Patent Office, Eesr dated Sep. 14, 2022, for corresponding Chinese application 20748758.8.
WIPO, International Search Report dated Apr. 9, 2020.

* cited by examiner

CELL HANDOVER METHOD AND DEVICE, AND USER PROCESSING METHOD AND DEVICE

The present disclosure claims the priority of the Chinese Patent Application No. 201910108600.2 filed with the CNIPA on Feb. 3, 2019, the entire contents of which are incorporated herein by reference.

TECHNICAL FIELD

The present disclosure relates to the field of communications, and in particular, to a cell handover method, a cell handover device, a user processing method and a user processing device.

BACKGROUND

A non-public network (NPN) allows restricted and conditional access by users to one or more cells in a mobile communication network, while a common cell can allow access by all subscribers and roaming users of an operator. The NPN may use the concept of Closed Access Group (CAG) for access control, and the CAG refers to a group of subscribers which are allowed to access one or more specific cells. One User Equipment (UE) may belong to a plurality of CAGs each having a CAG ID, and thus each UE maintains a list of CAG IDs of the CAGs to which the UE belongs, that is, an allowed CAG ID list of the UE, and the CAG cells corresponding to the CAG IDs which are not included in the list are not accessible to the UE. Each CAG cell broadcasts a CAG ID, and members of the CAG identified by the CAG ID are allowed to access the cell.

The 5G network architecture is innovative and is flexible in networking. In a 5G network, a base station can be separated into two functional entities, namely a centralized network element and a distributed network element, and one base station includes one centralized network element which controls a plurality of distributed network elements. FIG. 1 is a schematic diagram illustrating an interface between a centralized network element and a distributed network element in the related art. As shown in FIG. 1, in view of the network architecture of separated centralized network element and distributed network element in the related art, a delay-insensitive network function may be deployed in the centralized network element, a delay-sensitive network function may be deployed in the distributed network element, and transmission and connection between the centralized network element and the distributed network element are carried out through an ideal or non-ideal fronthaul interface, so that a multipoint coordination function can be realized, and flexible networking of separated or integrated sites can be supported.

For the base station adopting the above architecture of separated centralized network element and distributed network element, when a user that is in connection with the base station is handed over among a plurality of base stations, that is, the user needs to perform cell handover, the base station cannot perform CAG connection management for the user during the cell handover of the user.

With respect to the above problem in the related art that the base station adopting the architecture of separated centralized network element and distributed network element cannot perform CAG connection management for the user during the cell handover of the user, no effective solution has been proposed in the related art.

SUMMARY

Embodiments of the present disclosure provide a cell handover method, a cell handover device, a user processing method and a user processing device, so as to solve at least the problem in the related art that the base station adopting the architecture of separated centralized network element and distributed network element cannot perform CAG connection management for the user in the cell handover process of the user.

According to an embodiment of the present disclosure, there is provided a cell handover method applied to a centralized network element, which includes:

receiving a trigger message sent by a UE, and sending a UE context setup request, which is configured to instruct a target distributed network element to set up a UE context, to the target distributed network element in response to the trigger message; and handing the UE over to a target cell corresponding to the target distributed network element according to the UE context.

According to another embodiment of the present disclosure, there is provided a cell handover method applied to a user side, which includes:

sending a trigger message, which is configured to instruct a target centralized network element to send a UE context setup request to a target distributed network element, to the target centralized network element, with the UE context setup request configured to instruct the target distributed network element to set up a UE context; and handing a UE over to a target cell corresponding to the target distributed network element according to the UE context.

According to another embodiment of the present disclosure, there is provided a user processing method applied to a base station side, which includes:

receiving a UE context modification request message sent by a core network, with the UE context modification request message configured to indicate expiration or update of CAG membership of a UE and carrying at least one of a CAG membership status of the UE and a cause value for the expiration or update of the CAG membership of the UE; and processing the UE according to the UE context modification request message.

According to another embodiment of the present disclosure, there is provided a user processing method applied to a core network side, which includes:

sending a UE context modification request message to a centralized network element, with the UE context modification request message configured to indicate expiration or update of CAG membership of a UE and carrying at least one of a CAG membership status of the UE and a cause value for the expiration or update of the CAG membership of the UE; and processing the UE according to the UE context modification request message.

According to another embodiment of the present disclosure, there is provided a cell handover device applied to a base station side, which includes:

a first receiving module configured to receive a trigger message sent by a UE, and send a UE context setup request, which is configured to instruct a target distributed network element to set up a UE context, to the target distributed network element in response to the trigger message; and a first handover module configured to hand the UE over to a target cell corresponding to the target distributed network element according to the UE context.

According to another embodiment of the present disclosure, there is provided a cell handover device applied to a user side, which includes:

a first sending module configured to send a trigger message, which is configured to instruct a target centralized network element to send a UE context setup request to a target distributed network element, to the target centralized network element, with the UE context setup request configured to instruct the target distributed network element to set up a UE context; and a second handover module configured to hand a UE over to a target cell corresponding to the target distributed network element according to the UE context.

According to another embodiment of the present disclosure, there is provided a user processing device applied to a base station side, which includes:

a second receiving module configured to receive a UE context modification request message sent by a core network, with the UE context modification request message configured to indicate expiration or update of CAG membership of a UE and carrying at least one of a CAG membership status of the UE and a cause value for the expiration or update of the CAG membership of the UE; and a first processing module configured to process the UE according to the UE context modification request message.

According to another embodiment of the present disclosure, there is provided a user processing device applied to a core network side, which includes:

a second sending module configured to send a UE context modification request message to a centralized network element, with the UE context modification request message configured to indicate expiration or update of CAG membership of a UE and carrying at least one of a CAG membership status of the UE and a cause value for the expiration or update of the CAG membership of the UE; and a second processing module configured to process the UE according to the UE context modification request message.

According to still another embodiment of the present disclosure, there is provided a storage medium having a computer program stored therein, and the computer program is configured to perform steps in any one of the above method embodiments when being executed.

According to yet another embodiment of the present disclosure, there is provided an electronic device, which includes a memory having a computer program stored therein, and a processor configured to run the computer program to perform steps in any one of the above method embodiments.

According to the present disclosure, the base station can receive the trigger message sent by the UE, and send the UE context setup request to the target distributed network element in response to the trigger message to instruct the target distributed network element to set up the UE context, and then the UE can be handed over to the target cell corresponding to the target distributed network element according to the UE context. Therefore, the present disclosure can solve the problem in the related art that the base station adopting the architecture of separated centralized network element and distributed network element cannot perform CAG connection management for the user during a cell handover process of the user, and produce an effect of performing CAG connection management for the user during the cell handover process of the user.

BRIEF DESCRIPTION OF THE DRAWINGS

The drawings described here are intended to provide a further understanding of the present disclosure and constitutes a part of the present disclosure. The exemplary embodiments of the present disclosure and the description thereof are intended to explain the present disclosure, but do not constitute improper limitation to the present disclosure. In the drawings.

DETAILED DESCRIPTION

The present disclosure will be described in detail below with reference to the drawings and embodiments. It should be noted that the embodiments of the present disclosure and the features therein may be combined with each other if no conflict is incurred.

It should be noted that the terms "first", "second" and the like in description, claims, and drawings of the present disclosure are used for distinguishing between similar objects, but not necessarily for describing a particular order or chronological order.

Figure 1:
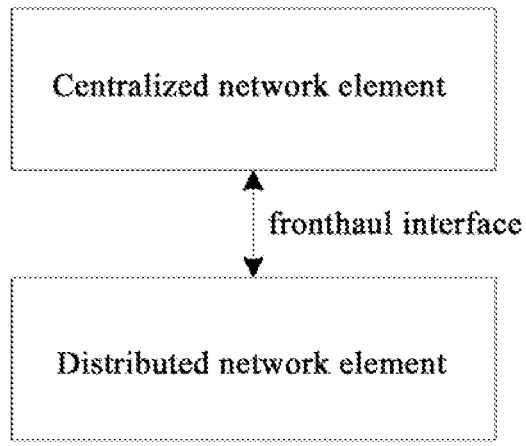
FIG. 1 is a schematic diagram illustrating an interface between a centralized network element and a distributed network element in the related art.
Figure 2:
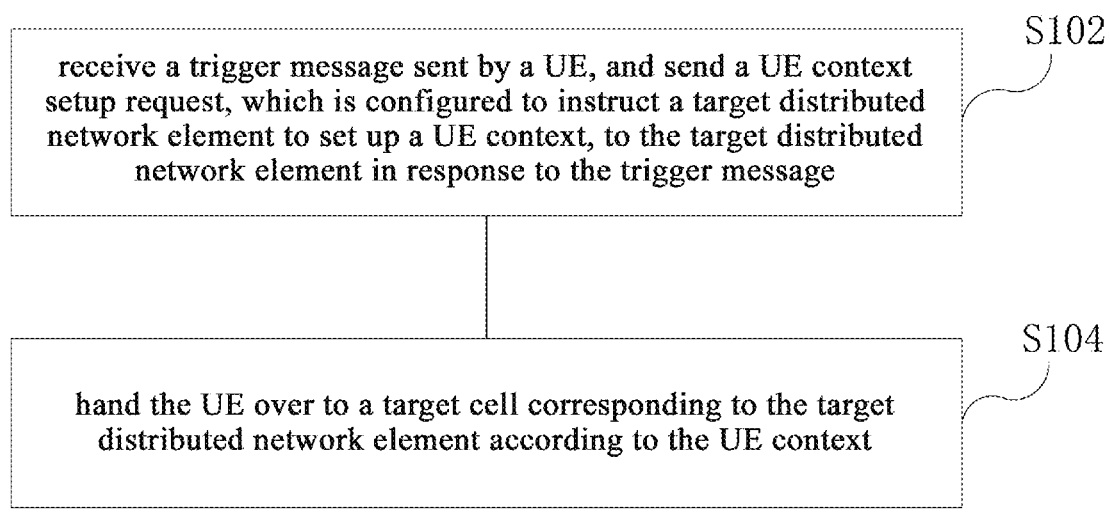
FIG. 2 is a flowchart illustrating a cell handover method according to an embodiment of the present disclosure.

An embodiment of the present disclosure provides a cell handover method applied to a centralized network element, and FIG. 2 is a flowchart illustrating a cell handover method according to an embodiment of the present disclosure. As shown in FIG. 2, the method includes the following steps:

S102, receiving a trigger message sent by a UE, and sending a UE context setup request, which is configured to instruct a target distributed network element to set up a UE context, to the target distributed network element in response to the trigger message; and S104, handing the UE over to a target cell corresponding to the target distributed network element according to the UE context.

With the method provided by the above embodiment, the base station can receive the trigger message sent by the UE, and send the UE context setup request to the target distributed network element in response to the trigger message to instruct the target distributed network element to set up the UE context, and then the UE can be handed over to the target cell corresponding to the target distributed network element according to the UE context. Therefore, the method provided by the above embodiment can solve the problem in the related art that the base station adopting the architecture of separated centralized network element and distributed network element cannot perform CAG connection management for the user during a cell handover process of the user, and produce an effect of performing CAG connection management for the user during the cell handover process of the user.

It should be noted that an executing entity of the above steps may be a base station, more specifically, a centralized network element in the base station. Specifically, the centralized network element may be, but is not limited to, a Centralized Unit (CU) in a 5G scenario.

It should be further noted that the target distributed network element in step S102 refers to a target distributed network element serving as a handover target in the cell handover process of the user, and the target distributed network element and a distributed network element connected to the user before the cell handover process may belong to the same centralized network element, or belong to different centralized network elements. Based on the above, the cell handover method provided by the embodiment can be applied to cell handover by the user in different scenarios, for example, the user is handed over to a target distributed network element under a source centralized network element from a source distributed network element (that is, the scenario of the cell handover corresponds to different distributed network elements under the same centralized network element), or the user is handed over to a target distributed network element under a target centralized network element, different from the source centralized network element, from the source distributed network element (that is, the scenario of the cell handover corresponds to different distributed network elements under different centralized network elements). The present disclosure makes no limitation to specific cell handover scenarios.

In addition, in an implementation, the step S104 of handing the UE over to the target cell corresponding to the target distributed network element according to the UE context may include performing Radio Resource Control (RRC) connection reconfiguration between the target centralized network element (in the case where the target distributed network element and the source distributed network element belong to the same centralized network element, the target centralized network element is also the source centralized network element) and the UE, and enabling a random access procedure between the target distributed network element and the UE, in this way, the connection between the base station and the user can be set up after the cell handover is completed, so that the base station corresponding to the cell to which the user is handed over can provide corresponding services for the user.

In an implementation, the trigger message in the step S102 includes at least one of:

a measurement report reported by the UE, a handover request message sent by a core network, and a handover request message sent by a source base station.

It should be further noted that the source base station is a base station corresponding to the cell (different from the target cell) to which the UE belongs before the cell handover.

In an implementation, the trigger message in the step S102 carries CAG membership information of the target cell; and the CAG membership information of the target cell includes at least one of an identifier (ID) of Public Land Mobile Network (PLMN) to which the target cell belongs, a CAG ID of the target cell, a membership status of the UE in the CAG to which the target cell belongs, and a cell access mode of the target cell.

It should be further noted that the CAG membership information of the target cell is specifically used to indicate UEs which are allowed to access the target cell or be handed over to the target cell. Whether the UE can be allowed to be handed over to the target cell can be determined by comparing or matching the CAG membership information of the target cell with an allowed CAG ID list of the UE.

In an implementation, after the step S102 of receiving the trigger message sent by the UE, the method further includes:

sending a first next generation (NG) interface message, which carries the CAG membership information of the target cell, to a core network, the first NG interface message includes at least one of a CAG membership verification request message, a Protocol Data Unit (PDU) session modification indication message, a UE context modification indication message, a handover request message and a path switch request message.

It should be further noted that the CAG membership information of the target cell carried in the first NG interface message can be verified by the core network when the first NG interface message is sent to the core network. Specifically, the above verification may be carried out through an Access and Mobility Management Function (AMF) of the core network, so as to verify whether the CAG membership information of the target cell matches the allowed CAG ID list of the UE.

In an implementation, the step of sending the first NG interface message to the core network includes:

sending the first NG interface message to the core network before the UE context setup request is sent to the target distributed network element in response to the trigger message; or sending the first NG interface message to the core network after the UE context setup request is sent to the target distributed network element in response to the trigger message.

It should be further noted that the first NG interface message may be sent to the core network before or after the UE context setup request is sent to the target distributed network element; and no matter whether the first NG interface message is sent to the core network before or after the UE context setup request is sent to the target distributed network element, the verification of whether the CAG membership information of the target cell matches the allowed CAG ID list of the UE can be carried out through the AMF of the core network during the cell handover process.

In an implementation, after the step of sending the first NG interface message to the core network, the method further includes:

receiving a second NG interface message, which is configured to instruct the core network to verify the CAG membership information of the target cell so as to obtain the membership status of the UE in the CAG to which the target cell belongs, the second NG interface message includes at least one of a CAG membership verification response message, a PDU session modification acknowledgement message, a UE context modification acknowledgement message, a handover request message and a path switch request response message.

It should be further noted that the membership status of the UE in the CAG to which the target cell belongs is a result obtained through the verification of the CAG membership information of the target cell performed by the AMF of the core network, concerning whether the CAG membership information of the target cell matches the allowed CAG ID list of the UE, that is, whether the UE belongs to the membership of the CAG to which the target cell belongs.

In an implementation, in the case where the membership status of the UE in the CAG to which the target cell belongs is used to indicate that the UE does not belong to the CAG membership corresponding to the target cell, the method includes:

sending a UE context modification request message to the target distributed network element, with the UE context modification request message carrying at least one of:

a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

It should be further noted that the CAG membership corresponding to the target cell is used to indicate members of the CAG to which the target cell belongs, and the membership status of the UE in the CAG to which the target cell belongs is used to indicate whether the UE belongs to the members of the CAG to which the target cell belongs. When the UE belongs to the members of the CAG to which the target cell belongs, the UE can achieve cell handover normally; and when the UE does not belong to the members of the CAG to which the target cell belongs, the UE cannot complete cell handover normally. With the above technical solution, by sending the UE context modification request message to the target distributed network element, the UE context can be modified in time by the target distributed network element to ensure that the cell handover process of the UE can be continued.

In an implementation, the cell access mode of the target cell is configured to indicate a type of the target cell, and the type of the target cell includes at least one of:

a hybrid CAG cell, a closed CAG cell and an open CAG cell.

In an implementation, the UE context setup request at least includes the CAG membership information of the target cell.

Several specific implementations are described below to further explain the cell handover method provided by the embodiment; and it should be further noted that, in all of the following specific implementations, the centralized network elements are CUs and the distributed network elements are Distributed Units (DUs).

Figure 3:
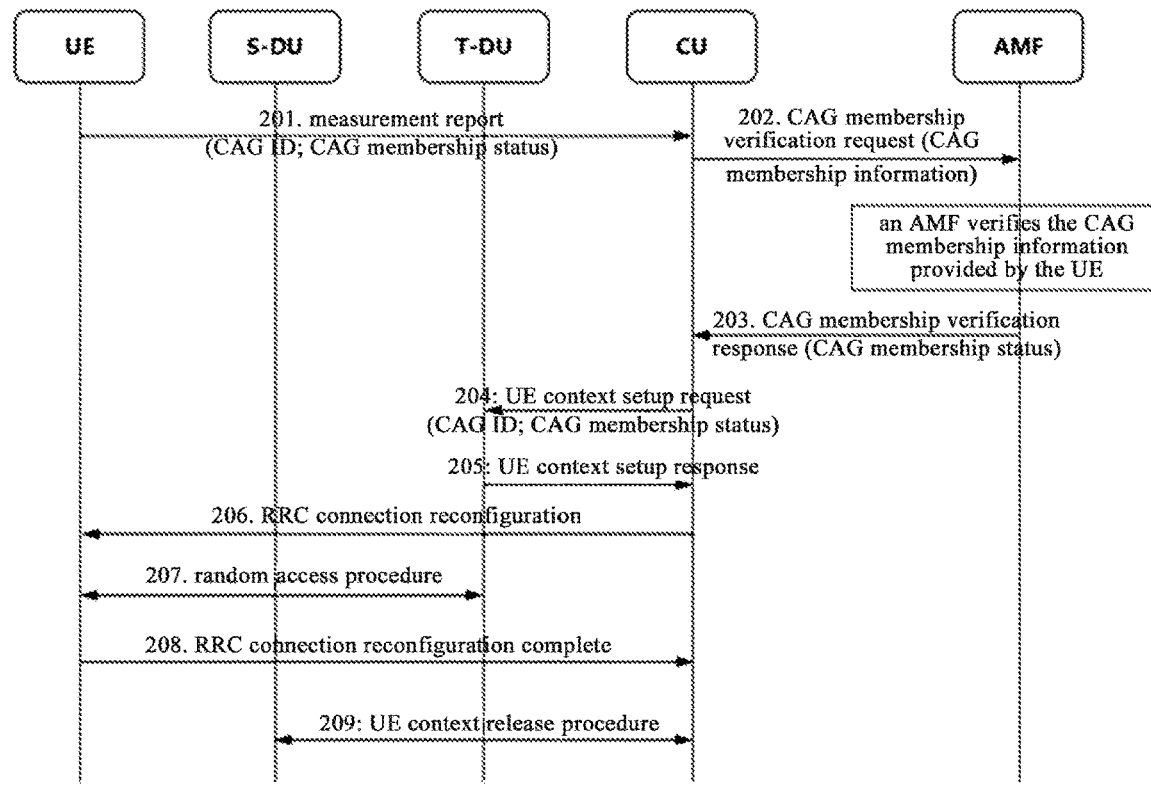
FIG. 3 is a schematic diagram illustrating interaction procedures of a cell handover method according to a specific implementation of the present disclosure.

A specific implementation I provides a specific flow of a cell handover process in a scenario where the cell handover is performed between different DUs that belong to a same CU, that is, a source CU before the cell handover is the same as a target CU after the cell handover, and the cell handover is carried out only among a plurality of DUs corresponding to the CU. Moreover, a verification procedure in the specific implementation adopts prior verification of the CAG membership information of a target cell by a core network. FIG. 3 is a schematic diagram illustrating interaction procedures of a cell handover method according to a specific implementation of the present disclosure. As shown in FIG. 3, the cell handover process according to the specific implementation is as follows:

in step 201, a UE reports a CAG ID of a target cell and a CAG membership status of the UE to a target CU through a measurement report;

in step 202, the target CU sends an NG interface message to a core network, with the NG interface message carrying a CAG membership verification request message configured to report the CAG membership information of the target cell to an AMF of the core network; and the CAG membership information of the target cell includes at least one of the CAG ID of the target cell, the CAG membership status in the target cell and a cell access mode of the target cell;

in step 203, the AMF subjects the CAG membership information provided by the UE to identity verification, that is, determines whether the CAG membership information of the target cell provided by the UE matches an allowed CAG ID list of the UE, and then sends a verified CAG membership status to the CU through a membership verification response message;

in step 204, the target CU sends the CAG ID of the target cell and the CAG membership status of the UE to a target DU through a UE context setup request message to instruct the target DU to set up a UE context;

in step 205, after the target DU sets up the UE context, the target DU sends a UE context setup response message to the target CU;

in step 206, the target CU triggers an RRC connection reconfiguration procedure with the UE;

in step 207, the UE and the target DU perform a random access procedure;

in step 208, the UE completes the RRC connection reconfiguration and sends an RRC connection reconfiguration complete message to the target CU; and in step 209, the target CU triggers a UE context release procedure with a source DU.

In this way, the UE can be handed over between different DUs under the same CU.

Figure 4:
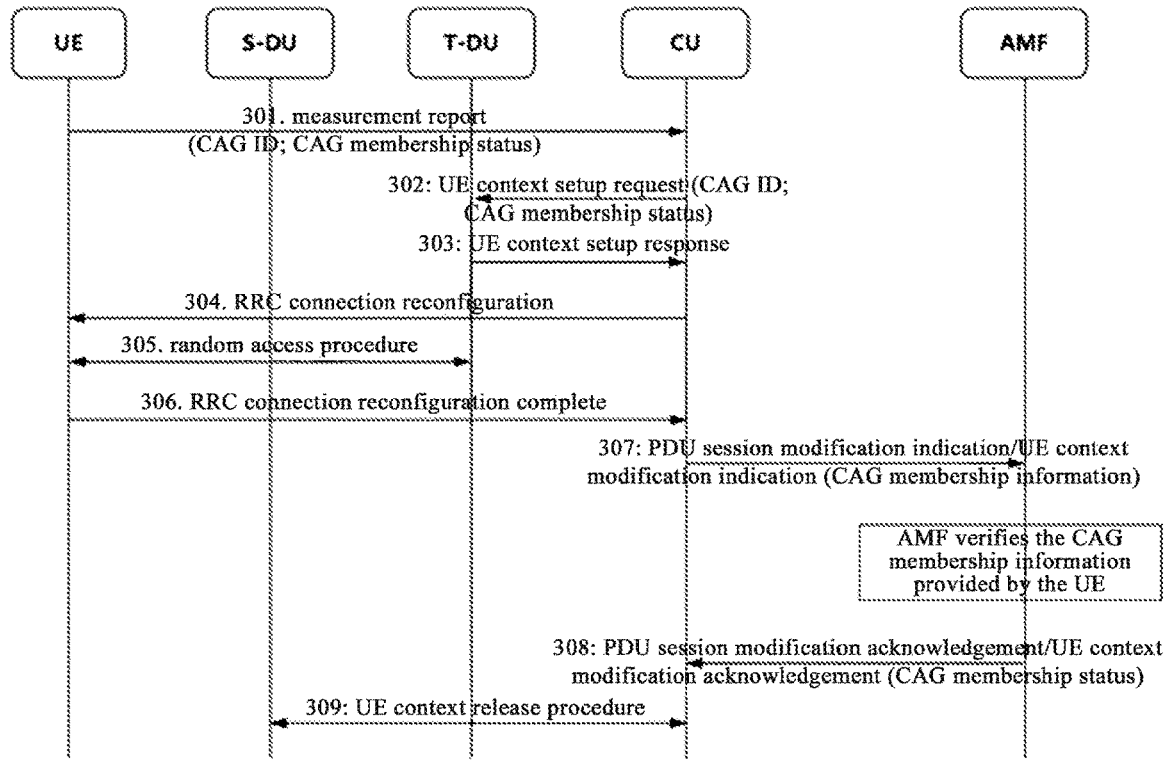
FIG. 4 is a schematic diagram illustrating interaction procedures of a cell handover method according to a specific implementation of the present disclosure.

A specific implementation II provides a specific flow of a cell handover process in a scenario where the cell handover is performed between different DUs that belong to a same CU, that is, a source CU before the cell handover is the same as a target CU after the cell handover, and the cell handover is carried out only among a plurality of DUs corresponding to the CU. Moreover, a verification procedure in the specific implementation adopts posterior verification of the CAG membership information of a target cell by a core network. FIG. 4 is a schematic diagram illustrating interaction procedures of a cell handover method according to a specific implementation of the present disclosure. As shown in FIG. 4, the cell handover process according to the specific implementation is as follows:

in step 301, a UE reports a CAG ID of a target cell and a CAG membership status of the UE to a target CU through a measurement report;

in step 302, the target CU sends the CAG ID of the target cell and the CAG membership status of the UE to a target DU through a UE context setup request message to instruct the target DU to set up a UE context;

in step 303, after the target DU sets up the UE context, the target DU sends a UE context setup response message to the target CU;

in step 304, the target CU triggers an RRC connection reconfiguration procedure with the UE;

in step 305, the UE and the target DU perform a random access procedure;

in step 306, the UE completes the RRC connection reconfiguration and sends an RRC connection reconfiguration complete message to the CU;

in step 307, the target CU sends the CAG membership information of the target cell to an AMF of a core network through a PDU session modification indication message or a UE context modification indication message; and the CAG membership information of the target cell includes at least one of the CAG ID of the target cell, the CAG membership status in the target cell and a cell access mode of the target cell which is configured to indicate whether the cell is a hybrid CAG cell, a closed CAG cell or an open CAG cell;

in step 308, the AMF of the core network subjects the CAG membership information provided by the UE to identity verification, that is, determines whether the CAG membership information of the target cell provided by the UE matches an allowed CAG ID list of the UE, and then sends a verified CAG membership status to the target CU through a PDU session modification acknowledgement message or a UE context modification acknowledgement message; and in step 309, the target CU triggers a UE context release procedure with a source DU.

If the CAG membership status returned in the step 308 is not consistent with the CAG membership status reported by the UE and stored by the CU, the following steps are performed:

1) the target CU sends a UE context modification request message, which carries the CAG ID of the target cell and the verified CAG membership status, to the target DU;
2) the target DU sends a UE context modification response message to the CU; and
3) the target CU or DU triggers subsequent operations, such as degradation of Quality of Service (QoS), handover and connection release, according to the updated CAG membership information.

Figure 5:
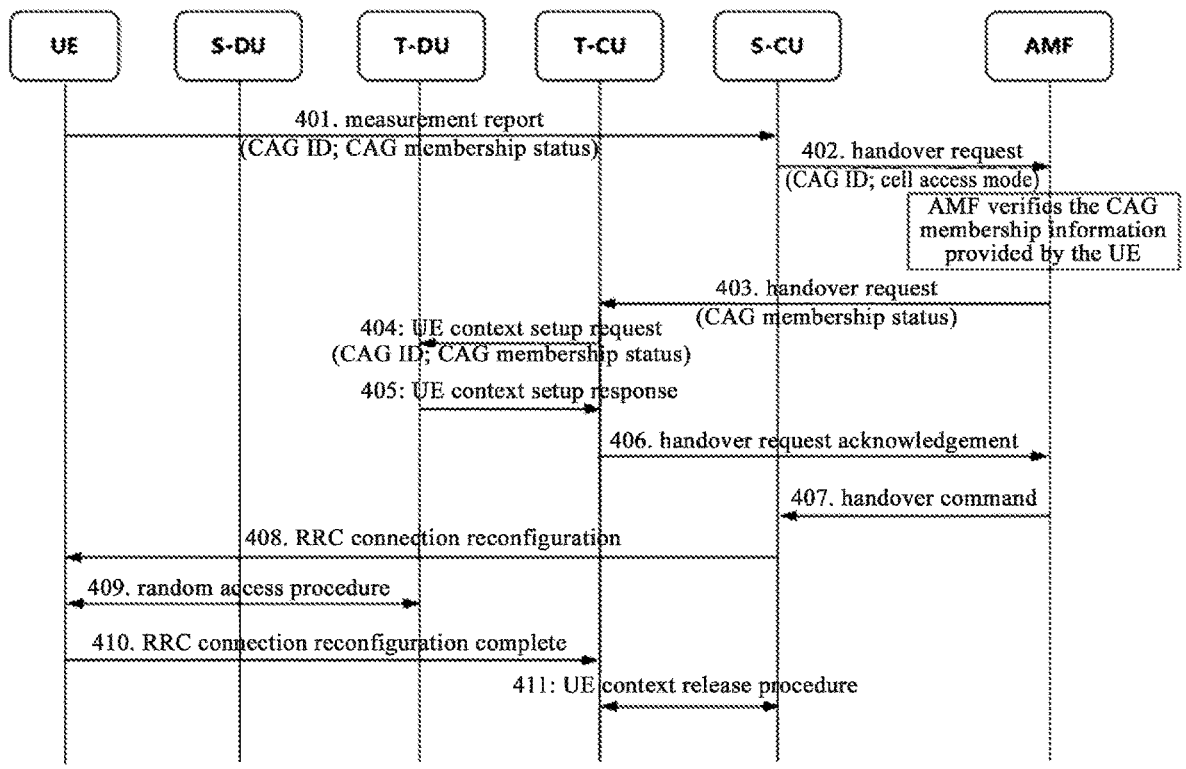
FIG. 5 is a schematic diagram illustrating interaction procedures of a cell handover method according to a specific implementation of the present disclosure.

A specific implementation III provides a specific flow of a cell handover process in a scenario where the cell handover is performed between different DUs that belong to different CUs, that is, a source CU before the cell handover is different from a target CU after the cell handover. Moreover, a verification procedure in the specific implementation adopts prior verification of the CAG membership information of a target cell by a core network. FIG. 5 is a schematic diagram illustrating interaction procedures of a cell handover method according to a specific implementation of the present disclosure. As shown in FIG. 5, the cell handover process according to the specific implementation is as follows:

in step 401, a UE reports a CAG ID of a target cell and a CAG membership status of the UE to a source CU through a measurement report;

in step 402, the source CU reports the CAG ID of the target cell and a cell access mode of the target cell to an AMF of a core network through a handover request message;

in step 403, the AMF of the core network verifies the received CAG membership information, that is, determines whether the CAG membership information of the target cell provided by the UE matches an allowed CAG ID list of the UE, and then sends a verified CAG membership status to a target CU through a handover request message;

in step 404, the target CU sends the CAG ID of the target cell and the CAG membership status to a target DU through a UE context setup request message to instruct the target DU to set up a UE context;

in step 405, after the target DU sets up the UE context, the target DU sends a UE context setup response message to the target CU;

in step 406, the target CU sends a handover request acknowledgment message to the AMF;

in step 407, the AMF sends a handover command message to the source CU;

in step 408, the source CU triggers an RRC connection reconfiguration procedure with the UE;

in step 409, the UE and the target DU perform a random access procedure;

in step 410, the UE completes the RRC connection reconfiguration and sends an RRC connection reconfiguration complete message to the target CU; and in step 411, the target CU triggers a UE context release procedure between the source CU and the source DU.

Figure 6:
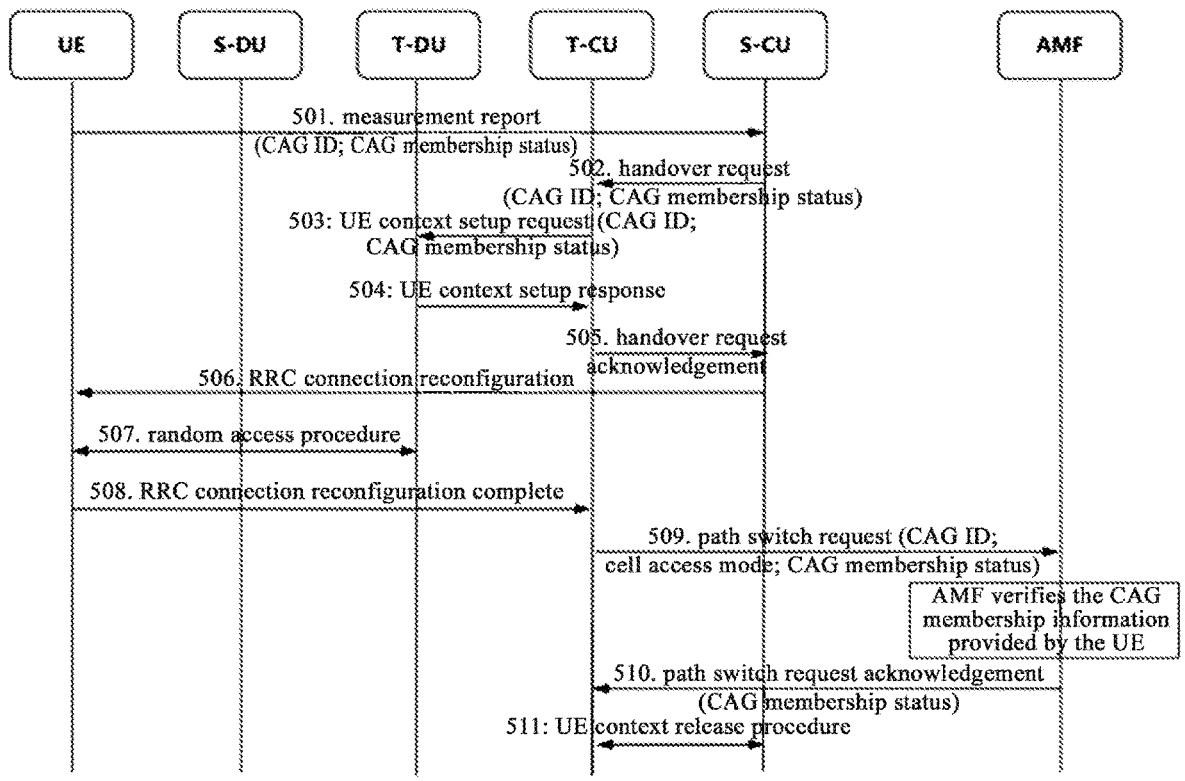
FIG. 6 is a schematic diagram illustrating interaction procedures of a cell handover method according to a specific implementation of the present disclosure.

A specific implementation IV provides a specific flow of a cell handover process in a scenario where the cell handover is performed between different DUs that belong to different CUs, that is, a source CU before the cell handover is different from a target CU after the cell handover. Moreover, a verification procedure in the specific implementation adopts posterior verification of the CAG membership information of a target cell by a core network. FIG. 6 is a schematic diagram illustrating interaction procedures of a cell handover method according to a specific implementation of the present disclosure. As shown in FIG. 6, the cell handover process according to the specific implementation is as follows:

in step 501, a UE reports a CAG ID of a target cell and a CAG membership status of the UE to a source CU through a measurement report;

in step 502, the source CU sends the CAG ID of the target cell and the CAG membership status of the UE to a target CU through a handover request message;

in step 503, the target CU sends the CAG ID of the target cell and the CAG membership status of the UE to a target DU through a UE context setup request message, and the target DU sets up a UE context;

in step 504, after the UE context is set up, the target DU sends a UE context setup response message to the target CU;

in step 505, the target CU sends a handover request acknowledgement message to an AMF;

in step 506, the source CU triggers an RRC connection reconfiguration procedure with the UE;

in step 507, the UE and the target DU perform a random access procedure;

in step 508, the UE completes the RRC connection reconfiguration and sends an RRC connection reconfiguration complete message to the target CU;

in step 509, the target CU reports the CAG ID of the target cell, a cell access mode of the target cell, and the CAG membership status of the UE to the AMF of a core network through a path switch request message;

in step 510, the AMF of the core network verifies the received CAG membership information, that is, determines whether the CAG membership information of the target cell provided by the UE matches an allowed CAG ID list of the UE, and then sends a verified CAG membership status to the target CU through a path switch request acknowledgement message; and in step 511, the target CU triggers a UE context release procedure between the source CU and the source DU.

If the CAG membership status returned in the step 510 is not consistent with the CAG membership status reported by the UE and stored by the target CU, the following steps are performed:

1) the target CU sends a UE context modification request message, which carries the CAG ID of the target cell and the verified CAG membership status, to the target DU;
2) the target DU sends a UE context modification response message to the target CU; and
3) the target CU or the target DU triggers subsequent operations, such as degradation of QoS, handover and connection release, according to the updated CAG membership information.

Through the above description of the implementations, those of ordinary skill in the art can understand clearly that the method according to the above embodiments may be implemented by software together with a necessary general-purpose hardware platform, or by hardware, but the former is preferable in most cases. Based on such understanding, the essence of the technical solutions of the present disclosure or the contribution made by the technical solutions of the present disclosure to the related art may be implemented in the form of a software product, which is stored in a storage medium (such as a Read-Only Memory (ROM)/ Random Access Memory (RAM), a magnetic disk and an optical disc) and includes several instructions to enable a terminal device (which may be a mobile phone, a computer, a server or a network device) to execute the method described in each embodiment of the present disclosure.

Figure 7:
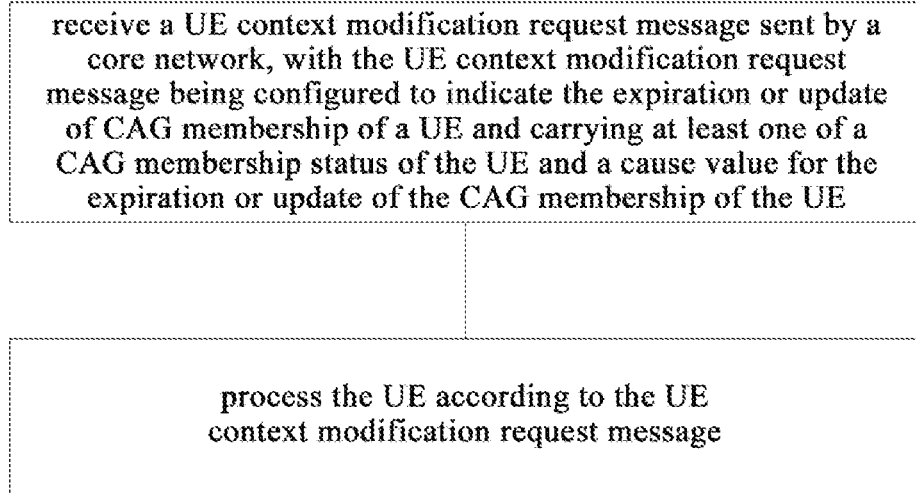
FIG. 7 is a flowchart illustrating a cell handover method according to an embodiment of the present disclosure.

An embodiment of the present disclosure further provides a cell handover method applied to a user side, and FIG. 7 is a flowchart illustrating a cell handover method according to an embodiment of the present disclosure. As shown in FIG. 7, the method includes the following steps:

S202, sending a trigger message, which is configured to instruct a target centralized network element to send a UE context setup request to a target distributed network element, to the target centralized network element, with the UE context setup request configured to instruct the target distributed network element to set up a UE context; and S204, handing a UE over to a target cell corresponding to the target distributed network element according to the UE context.

With the method provided by the above embodiment, the base station can receive the trigger message sent by the UE, and send the UE context setup request to the target distributed network element in response to the trigger message to instruct the target distributed network element to set up the UE context, and then the UE can be handed over to the target cell corresponding to the target distributed network element according to the UE context. Therefore, the method provided by the above embodiment can solve the problem in the related art that the base station adopting the architecture of separated centralized network element and distributed network element cannot perform CAG connection management for the user during a cell handover process of the user, and produce an effect of performing CAG connection management for the user during the cell handover process of the user.

It should be noted that the executing entity of the above steps may be a user, but the present disclosure is not limited thereto.

It should be further noted that, in the step S202, the target centralized network element refers to a centralized network element corresponding to the target cell serving as a handover target in the cell handover process, and the target distributed network element refers to a distributed network element corresponding to the target cell serving as the handover target in the cell handover process; and the target centralized network element may be the same as a source centralized network element before the cell handover process, that is, the UE is handed over between different distributed network elements that belong to a same centralized network element, or the target centralized network element may be different from the source centralized network elements before the cell handover process, which is not limited in the present disclosure.

In an implementation, the step S204 of handing the UE over to the target cell corresponding to the target distributed network element according to the UE context may include performing RRC connection reconfiguration between the target centralized network element and the UE, and enabling a random access procedure between the target distributed network element and the UE, in this way, the connection between the base station and the user can be set up after the cell handover is completed, so that the base station corresponding to the cell to which the user is handed over can provide corresponding services for the user.

In an implementation, the trigger message includes at least one of:

a measurement report reported by the UE, a handover request message sent by a core network, and a handover request message sent by a source base station.

In an implementation, the trigger message carries CAG membership information of the target cell; and the CAG membership information of the target cell includes at least one of an identifier of PLMN to which the target cell belongs, a CAG ID of the target cell, a membership status of the UE in the CAG to which the target cell belongs, and a cell access mode of the target cell.

In an implementation, the trigger message is further configured to instruct the target centralized network element to send a first NG interface message, which carries the CAG membership information of the target cell, to the core network, the first NG interface message includes at least one of a CAG membership verification request message, a PDU session modification indication message, a UE context modification indication message, a handover request message and a path switch request message.

In an implementation, the step of sending the first NG interface message to the core network by the target centralized network element includes:

sending the first NG interface message to the core network by the target centralized network element before the target centralized network element sends the UE context setup request to the target distributed network element; or sending the first NG interface message to the core network by the target centralized network element after the target centralized network element sends the UE context setup request to the target distributed network element.

In an implementation, after the step of sending the first NG interface message to the core network by the target centralized network element, the method further includes:

receiving a second NG interface message, which is configured to instruct the core network to verify the CAG membership information of the target cell so as to obtain the membership status of the UE in the CAG to which the target cell belongs, the second NG interface message includes at least one of a CAG membership verification response message, a PDU session modification acknowledgement message, a UE context modification acknowledgement message, a handover request message and a path switch request response message.

In an implementation, in the case where the membership status of the UE in the CAG to which the target cell belongs is used to indicate that the UE does not belong to the CAG membership corresponding to the target cell, the method includes:

sending a UE context modification request message by the target centralized network element to the target distributed network element, with the UE context modification request message carrying at least one of:

a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

In an implementation, the cell access mode of the target cell is configured to indicate a type of the target cell, and the type of the target cell includes at least one of:

a hybrid CAG cell, a closed CAG cell and an open CAG cell.

In an implementation, the UE context setup request at least includes the CAG membership information of the target cell.

Through the above description of the implementations, those of ordinary skill in the art can understand clearly that the method according to the above embodiments may be implemented by software together with a necessary general-purpose hardware platform, or by hardware, but the former is preferable in most cases. Based on such understanding, the essence of the technical solutions of the present disclosure or the contribution made by the technical solutions of the present disclosure to the related art may be implemented in the form of a software product, which is stored in a storage medium (such as an ROM/RAM, a magnetic disk and an optical disc) and includes several instructions to enable a terminal device (which may be a mobile phone, a computer, a server or a network device) to execute the method described in each embodiment of the present disclosure.

Figure 8:
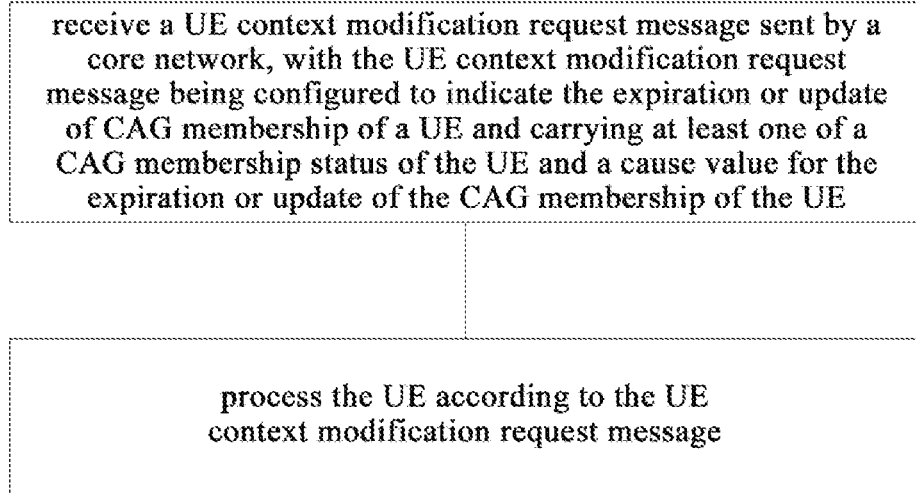
FIG. 8 is a flowchart illustrating a user processing method according to an embodiment of the present disclosure.

An embodiment of the present disclosure further provides a user processing method applied to a base station side, and FIG. 8 is a flowchart illustrating a user processing method according to an embodiment of the present disclosure. As shown in FIG. 8, the method includes the following steps:

S302, receiving a UE context modification request message sent by a core network, with the UE context modification request message configured to indicate the expiration or update of CAG membership of a UE and carrying at least one of a CAG membership status of the UE and a cause value for the expiration or update of the CAG membership of the UE; and S304, processing the UE according to the UE context modification request message.

With the method provided by the above embodiment, the base station can receive the UE context modification request message which is sent by the core network and configured to indicate the expiration or update of the CAG membership of the UE, and process the UE according to the UE context modification request message. Therefore, the method provided by the above embodiment can solve the problem in the related art that the core network cannot effectively verify the CAG membership of the user during a connection process between the base station adopting the architecture of separated centralized network element and distributed network element and the user, and thus produce an effect that the core network can effectively verify the CAG membership of the user.

It should be further noted that the executing entity of the above steps is the base station, but the present disclosure is not limited thereto.

In an implementation, after the step S302 of receiving the UE context modification request message sent by the core network, the method further includes:

sending a UE context modification request message to a target distributed network element, with the UE context modification request message carrying at least one of the CAG membership status of the UE and the cause value for the expiration or update of the CAG membership of the UE.

In an implementation, the step of processing the UE according to the UE context modification request message includes at least one of the following steps:

triggering a cell handover procedure by a centralized network element;

triggering a UE context release procedure by the centralized network element;

triggering the UE context release procedure by the target distributed network element;

triggering the UE context release procedure by the core network; and degrading the QoS of the UE by the core network.

In an implementation, the step of triggering the UE context release procedure by the centralized network element includes:

sending a UE context release request message by the centralized network element to the core network, with the UE context release request message carrying the cause value for the expiration or update of the CAG membership of the UE; or sending a UE context release command message by the centralized network element to the distributed network element, with the UE context release command message carrying the cause value for the expiration or update of the CAG membership of the UE.

In an implementation, the step of triggering the UE context release procedure by the target distributed network element includes:

receiving a UE context release request message from the target distributed network element by the centralized network element, with the UE context release request message carrying the cause value for the expiration or update of the CAG membership of the UE.

In an implementation, the step of triggering the UE context release procedure by the core network includes:

receiving a UE context release command message from the core network by the centralized network element, with the UE context release command message carrying the cause value for the expiration or update of the CAG membership of the UE.

In an implementation, after the step of receiving the UE context release command message from the core network by the centralized network element, the method further includes:

sending a UE context release command message to the target distributed network element, with the UE context release command message carrying the cause value for the expiration or update of the CAG membership of the UE.

In an implementation, the user processing method further includes:

sending a third NG interface message to the core network in the case where the UE is handed over from a CAG to another CAG cell, with the third NG interface message carrying an updated CAG ID of the UE.

It should be further noted that the another CAG cell refers to a cell other than a source cell of the UE, that is, a target cell in a cell handover process, and the target cell and the source cell belong to the same CAG or different CAGs. With the above technical solution, the core network can be informed of the updated CAG membership of the UE, so as to update the CAG membership of the UE in time.

In an implementation, the third NG interface message at least includes a location report message.

Several specific implementations are described below to further explain the implementation of the user processing method provided by the embodiment; and it should be further noted that, in all of the following specific implementations, the centralized network elements are CUs and the distributed network elements are DUs.

Figure 9:
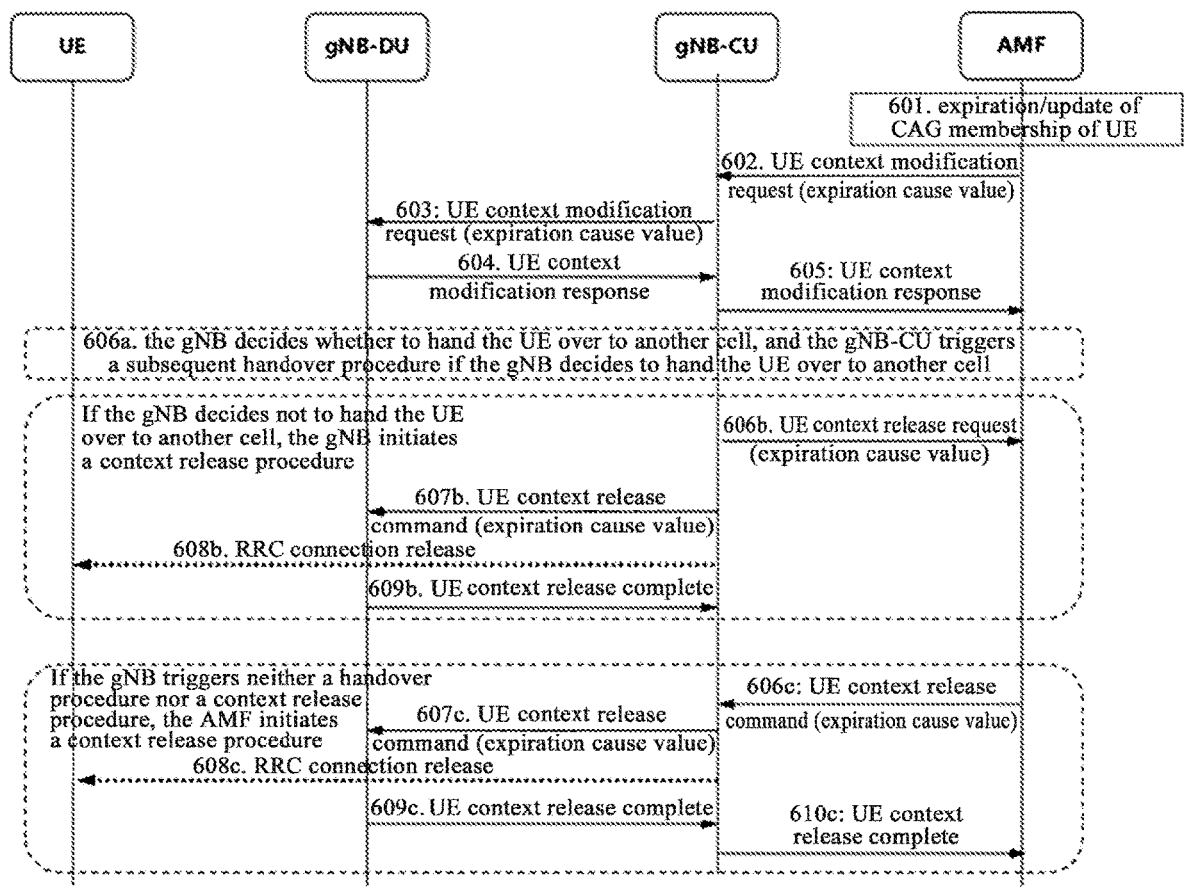
FIG. 9 is a schematic diagram illustrating interaction procedures of a user processing method according to a specific implementation of the present disclosure.

A specific implementation V provides a specific flow of a user processing process performed in a closed CAG cell. FIG. 9 is a schematic diagram illustrating interaction procedures of a user processing method according to a specific implementation of the present disclosure. As shown in FIG. 9, the user processing process according to the specific implementation is as follows:

in step 601, an AMF of a core network detects the expiration or update of the CAG membership of a UE;

it should be further noted that the above detection process carried out by the AMF of the core network refers to comparing the CAG membership of the UE with a preset list by the AMF in a preset period or according to a trigger instruction to determine whether the CAG membership of the UE is expired or updated;

in step 602, the AMF of the core network triggers a UE context modification request message to change a CAG member status in a corresponding cell, which is stored in a gNB-CU, from a member to a non-member;

in step 603, the gNB-CU sends a UE context modification request message to a gNB-DU to change a membership status in the corresponding cell under the gNB-DU from a member to a non-member;

in step 604, the gNB-DU sends a UE context modification response message to the gNB-CU;

optionally, the gNB-DU triggers a UE context release request procedure of an F 1 interface to request for UE context release, carrying a cause value for the expiration or update the CAG membership of the UE;

in step 605, the gNB-CU sends a UE context modification response message to the AMF;

according to the behaviors of the gNB, any of the following three solutions may be selected:

1) If the gNB decides to hand the UE over to another cell, the following step is performed: in step 606a, the gNB-CU triggers a subsequent cell handover procedure;

2) If the gNB decides not to hand the UE over to another cell, the gNB initiates a context release procedure, and the following steps are performed:

in step 606b, the gNB-CU sends a UE context release request message, which carries the cause value for the expiration or update of the CAG membership of the UE, to the AMF;

in step 607b, the gNB-CU sends a UE context release command message, which carries the cause value for the expiration or update of the CAG membership of the UE, to the gNB-DU;

in step 608b, the gNB-CU initiates an RRC connection release procedure with the UE; in step 609b, the gNB-DU sends a UE context release complete message to the gNB-CU;

3) If the gNB triggers neither a handover procedure nor a context release procedure, the AMF initiates a context release procedure, and the following steps are performed:

in step 606c, the AMF sends a UE context release command message, which carries the cause value for the expiration or update of the CAG membership of the UE, to the gNB-CU;

in step 607c, the gNB-CU sends a UE context release command message, which carries the cause value for the expiration or update of the CAG membership of the UE, to the gNB-DU;

in step 608c, the gNB-CU initiates an RRC connection release procedure with the UE;

in step 609c, the gNB-DU sends a UE context release complete message to the gNB-CU;

in step 610c, the gNB-CU sends a UE context release complete message to the AMF.

Figure 10:
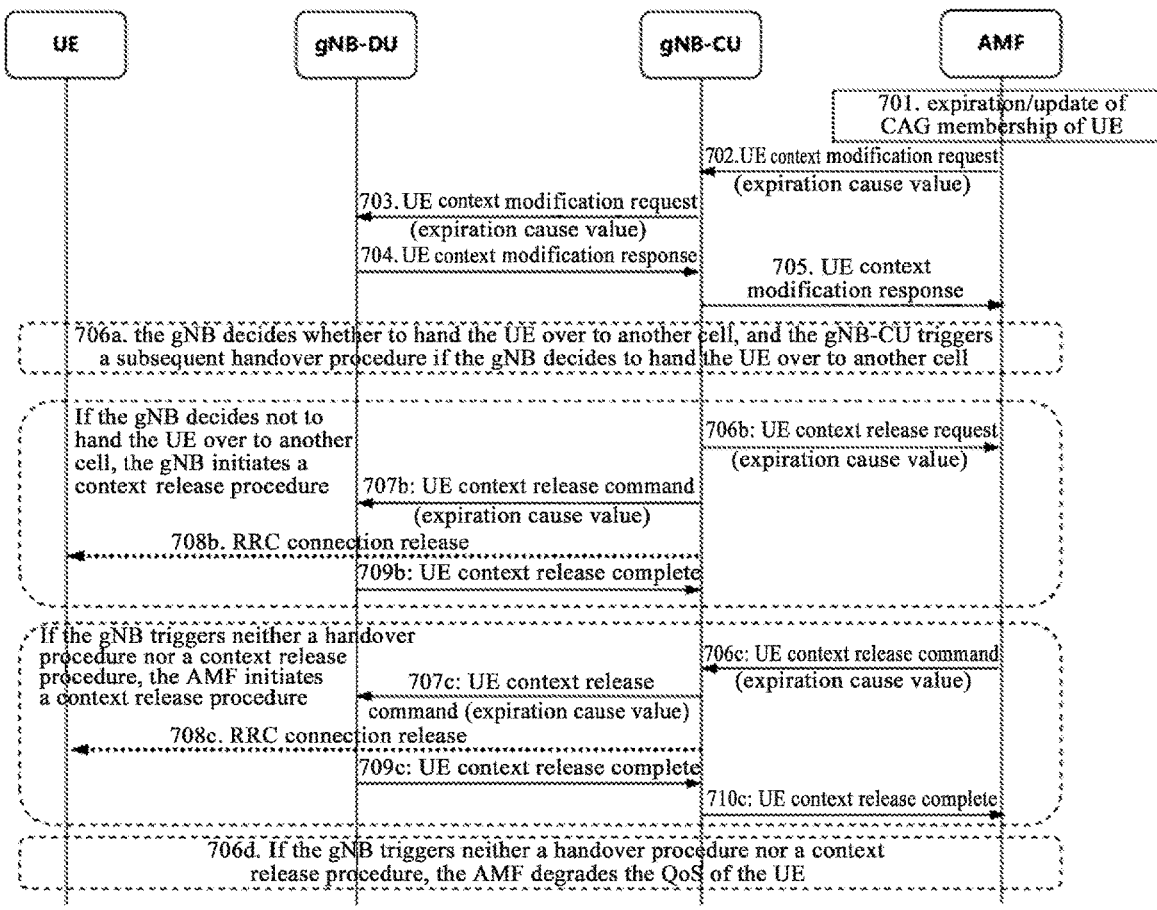
FIG. 10 is a schematic diagram illustrating interaction procedures of a user processing method according to a specific implementation of the present disclosure.

A specific implementation VI provides a specific flow of a user processing process performed in a hybrid CAG cell. FIG. 10 is a schematic diagram illustrating interaction procedures of a user processing method according to a specific implementation of the present disclosure. As shown in FIG. 10, the user processing process according to the specific implementation is as follows:

in step 701, an AMF of a core network detects the expiration or update of the CAG membership of a UE;

in step 702, the AMF of the core network triggers a UE context modification request message to change a CAG member status in a corresponding cell, which is stored in a gNB-CU, from a member to a non-member;

in step 703, the gNB-CU sends a UE context modification request message to a gNB-DU to change a CAG membership status in the corresponding cell under the gNB-DU from a member to a non-member;

in step 704, the gNB-DU sends a UE context modification response message to the gNB-CU; optionally, the gNB-DU triggers a UE context release request procedure of an F 1 interface to request for UE context release, carrying a cause value for the expiration or update the CAG membership of the UE;

in step 705, the gNB-CU sends a UE context modification response message to the AMF;

according to the behaviors of the gNB, any of the following three solutions may be selected:

1) If the gNB decides to hand the UE over to another cell, the following step is performed: in step 706a, the gNB-CU triggers a subsequent cell handover procedure;

2) If the gNB decides not to hand the UE over to another cell, the gNB initiates a context release procedure, and the following steps are performed:

in step 706b, the gNB-CU sends a UE context release request message, which carries the cause value for the expiration or update of the CAG membership of the UE, to the AMF;

in step 707b, the gNB-CU sends a UE context release command message, which carries the cause value for the expiration or update of the CAG membership of the UE, to the gNB-DU;

in step 708b, the gNB-CU initiates an RRC connection release procedure with the UE; in step 709b, the gNB-DU sends a UE context release complete message to the gNB-CU;

3) If the gNB triggers neither a handover procedure nor a context release procedure, the AMF initiates a context release procedure, and the following steps are performed:

in step 706c, the AMF sends a UE context release command message, which carries the cause value for the expiration or update of the CAG membership of the UE, to the gNB-CU;

in step 707c, the gNB-CU sends a UE context release command message, which carries the cause value for the expiration or update of the CAG membership of the UE, to the gNB-DU;

in step 708c, the gNB-CU initiates an RRC connection release procedure with the UE; in step 709c, the gNB-DU sends a UE context release complete message to the gNB-CU; in step 710c, the gNB-CU sends a UE context release complete message to the AMF;

4) If the gNB triggers neither a handover procedure nor a context release procedure, the following step may be further performed:

in step 706d, the AMF degrades the QoS of the UE.

Figure 11:
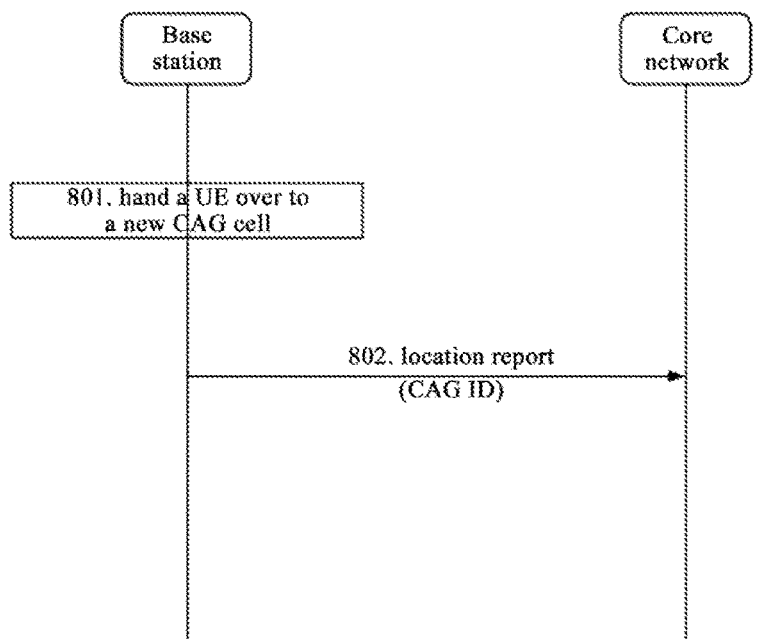
FIG. 11 is a schematic diagram illustrating interaction procedures of a user processing method according to a specific implementation of the present disclosure.

A specific implementation VII provides a specific flow of a user processing process, and specifically provides interaction procedures between the updated CAG membership and a core network in a CAG membership updating process of a user. FIG. 11 is a schematic diagram illustrating interaction procedures of a user processing method according to a specific implementation of the present disclosure. As shown in FIG. 11, the user processing process according to the specific implementation is as follows:

in step 801, a UE is handed over to a new CAG cell; and in step 802, an updated CAG ID is reported to a core network by a base station side through a location report.

Through the above description of the implementations, those of ordinary skill in the art can understand clearly that the method according to the above embodiments may be implemented by software together with a necessary general-purpose hardware platform, or by hardware, but the former is preferable in most cases. Based on such understanding, the essence of the technical solutions of the present disclosure or the contribution made by the technical solutions of the present disclosure to the related art may be implemented in the form of a software product, which is stored in a storage medium (such as an ROM/RAM, a magnetic disk and an optical disc) and includes several instructions to enable a terminal device (which may be a mobile phone, a computer, a server or a network device) to execute the method described in each embodiment of the present disclosure.

Figure 12:
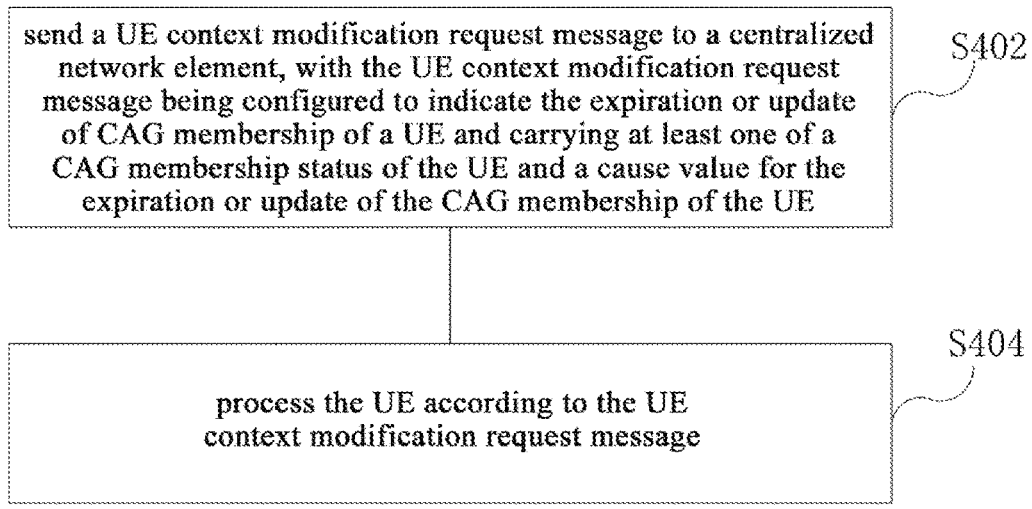
FIG. 12 is a flowchart illustrating a user processing method according to an embodiment of the present disclosure.

An embodiment of the present disclosure further provides a user processing method applied to a core network side, and FIG. 12 is a flowchart illustrating a user processing method according to an embodiment of the present disclosure. As shown in FIG. 12, the method includes the following steps:

S402, sending a UE context modification request message to a centralized network element, with the UE context modification request message configured to indicate the expiration or update of CAG membership of a UE and carrying at least one of a CAG membership status of the UE and a cause value for the expiration or update of the CAG membership of the UE; and S404, processing the UE according to the UE context modification request message.

With the method provided by the above embodiment, the base station can receive the UE context modification request message which is sent by the core network and configured to indicate the expiration or update of the CAG membership of the UE, and process the UE according to the UE context modification request message. Therefore, the method provided by the above embodiment can solve the problem in the related art that the core network cannot effectively verify the CAG membership of the user during a connection process between the base station adopting the architecture of separated centralized network element and distributed network element and the user, and thus produce an effect that the core network can effectively verify the CAG membership of the user.

It should be further noted that the executing entity of the above steps is a core network, but the present disclosure is not limited thereto.

In an implementation, after the step S402 of sending the UE context modification request message to the centralized network element, the method further includes:

sending the UE context modification request message to a target distributed network element, with the UE context modification request message carrying at least one of the CAG membership status of the UE and the cause value for the expiration or update of the CAG membership of the UE.

In an implementation, the step of processing the UE according to the UE context modification request message includes at least one of the following steps:

triggering a cell handover procedure by a centralized network element;

triggering a UE context release procedure by the centralized network element;

triggering the UE context release procedure by the target distributed network element;

triggering the UE context release procedure by the core network; and degrading the QoS of the UE by the core network.

In an implementation, the step of triggering the UE context release procedure by the centralized network element includes:

sending a UE context release request message by the centralized network element to the core network, with the UE context release request message carrying the cause value for the expiration or update of the CAG membership of the UE; or sending a UE context release command message by the centralized network element to the distributed network element, with the UE context release command message carrying the cause value for the expiration or update of the CAG membership of the UE.

In an implementation, the step of triggering the UE context release procedure by the target distributed network element includes:

receiving a UE context release request message from the target distributed network element by the centralized network element, with the UE context release request message carrying the cause value for the expiration or update of the CAG membership of the UE.

In an implementation, the step of triggering the UE context release procedure by the core network includes:

receiving a UE context release command message from the core network by the centralized network element, with the UE context release command message carrying the cause value for the expiration or update of the CAG membership of the UE.

In an implementation, after the step of receiving the UE context release command message from the core network by the centralized network element, the method further includes:

sending a UE context release command message to the target distributed network element, with the UE context release command message carrying the cause value for the expiration or update of the CAG membership of the UE.

In an implementation, the user processing method further includes:

sending a third NG interface message to the core network in the case where the UE is handed over from a CAG to another CAG cell, with the third NG interface message carrying an updated CAG ID of the UE.

In an implementation, the third NG interface message at least includes a location report message.

Through the above description of the implementations, those of ordinary skill in the art can understand clearly that the method according to the above embodiments may be implemented by software together with a necessary general-purpose hardware platform, or by hardware, but the former is preferable in most cases. Based on such understanding, the essence of the technical solutions of the present disclosure or the contribution made by the technical solutions of the present disclosure to the related art may be implemented in the form of a software product, which is stored in a storage medium (such as an ROM/RAM, a magnetic disk and an optical disc) and includes several instructions to enable a terminal device (which may be a mobile phone, a computer, a server or a network device) to execute the method described in each embodiment of the present disclosure.

An embodiment of the present disclosure further provides a cell handover device configured to implement the above embodiments and preferable embodiments, and what is described above will not be repeated here. The term "module" used below refers to software, hardware, or a combination of software and hardware that can perform predetermined functions. Although the device described in the following embodiment may be preferably implemented by software, the implementations of the device by hardware or a combination of software and hardware are possible and can be conceived.

Figure 13:
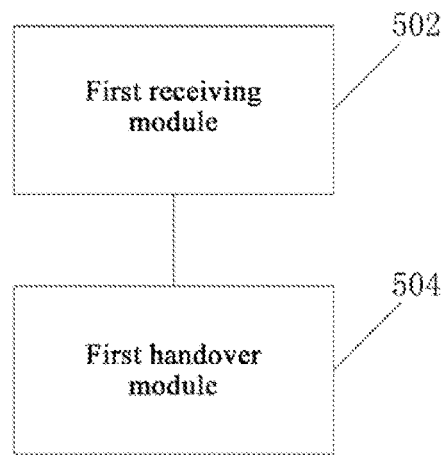
FIG. 13 is a block diagram of a cell handover device according to an embodiment of the present disclosure.

FIG. 13 is a block diagram of a cell handover device according to an embodiment of the present disclosure. As shown in FIG. 13, the device includes:

a first receiving module 502 configured to receive a trigger message sent by a UE, and send a UE context setup request, which is configured to instruct a target distributed network element to set up a UE context, to the target distributed network element in response to the trigger message; and a first handover module 504 configured to hand the UE over to a target cell corresponding to the target distributed network element according to the UE context.

With the device provided by the above embodiment, the base station can receive the trigger message sent by the UE, and send the UE context setup request to the target distributed network element in response to the trigger message to instruct the target distributed network element to set up the UE context, and then the UE can be handed over to the target cell corresponding to the target distributed network element according to the UE context. Therefore, the device provided by the above embodiment can solve the problem in the related art that the base station adopting the architecture of separated centralized network element and distributed network element cannot perform CAG connection management for the user during a cell handover process of the user, and produce an effect of performing CAG connection management for the user during the cell handover process of the user.

It should be noted that the executing entity of the above steps may be a base station, more specifically, may be a centralized network element in the base station, but the present disclosure is not limited thereto.

In an implementation, the trigger message received by the first receiving module 502 includes at least one of:

a measurement report reported by the UE, a handover request message sent by a core network, and a handover request message sent by a source base station.

In an implementation, the trigger message received by the first receiving module 502 carries CAG membership information of the target cell; and the CAG membership information of the target cell includes at least one of an identifier of PLMN to which the target cell belongs, a CAG ID of the target cell, a membership status of the UE in the CAG to which the target cell belongs, and a cell access mode of the target cell.

In an implementation, the first receiving module 502 is configured to:

after receiving the trigger message sent by the UE, send a first NG interface message, which carries the CAG membership information of the target cell, to a core network, the first NG interface message includes at least one of a CAG membership verification request message, a PDU session modification indication message, a UE context modification indication message, a handover request message and a path switch request message.

In an implementation, sending the first NG interface message to the core network includes:

sending the first NG interface message to the core network before the UE context setup request is sent to the target distributed network element in response to the trigger message; or sending the first NG interface message to the core network after the UE context setup request is sent to the target distributed network element in response to the trigger message.

In an implementation, after the first NG interface message is sent to the core network, a second NG interface message, which is configured to instruct the core network to verify the CAG membership information of the target cell so as to obtain the membership status of the UE in the CAG to which the target cell belongs, is received, the second NG interface message includes at least one of a CAG membership verification response message, a PDU session modification acknowledgement message, a UE context modification acknowledgement message, a handover request message and a path switch request response message.

In an implementation, in the case where the membership status of the UE in the CAG to which the target cell belongs is used to indicate that the UE does not belong to the CAG membership corresponding to the target cell, a UE context modification request message is sent to the target distributed network element, with the UE context modification request message carrying at least one of:

a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

In an implementation, the cell access mode of the target cell is configured to indicate a type of the target cell, and the type of the target cell includes at least one of:

a hybrid CAG cell, a closed CAG cell and an open CAG cell.

In an implementation, the UE context setup request at least includes the CAG membership information of the target cell.

It should be noted that the above modules may be implemented by software or hardware. When by hardware, the modules may be implemented in the following ways: all the modules are located in the same processor, or the modules are randomly combined and located in different processors.

An embodiment of the present disclosure further provides a cell handover device configured to implement the above embodiments and preferable embodiments, and what is described above will not be repeated here. The term "module" used below refers to software, hardware, or a combination of software and hardware that can perform predetermined functions. Although the device described in the following embodiment may be preferably implemented by software, the implementations of the device by hardware or a combination of software and hardware are possible and can be conceived.

Figure 14:
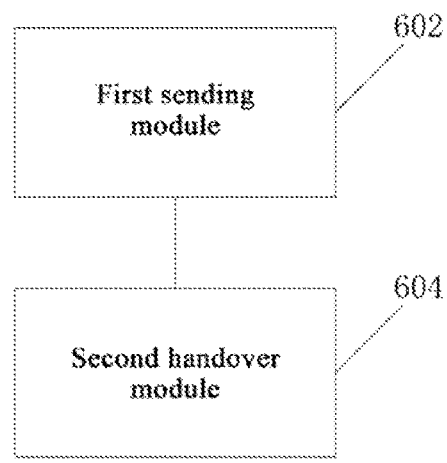
FIG. 14 is a block diagram of a cell handover device according to an embodiment of the present disclosure.

FIG. 14 is a block diagram of a cell handover device according to an embodiment of the present disclosure. As shown in FIG. 14, the device includes:

a first sending module 602 configured to send a trigger message, which is configured to instruct a target centralized network element to send a UE context setup request to a target distributed network element, to the target centralized network element, with the UE context setup request configured to instruct the target distributed network element to set up a UE context; and a second handover module 604 configured to hand a UE over to a target cell corresponding to the target distributed network element according to the UE context.

With the device provided by the above embodiment, the base station can receive the trigger message sent by the UE, and send the UE context setup request to the target distributed network element in response to the trigger message to instruct the target distributed network element to set up the UE context, and then the UE can be handed over to the target cell corresponding to the target distributed network element according to the UE context. Therefore, the device provided by the above embodiment can solve the problem in the related art that the base station adopting the architecture of separated centralized network element and distributed network element cannot perform CAG connection management for the user during a cell handover process of the user, and produce an effect of performing CAG connection management for the user during the cell handover process of the user.

In an implementation, the trigger message includes at least one of:

a measurement report reported by the UE, a handover request message sent by a core network, and a handover request message sent by a source base station.

In an implementation, the trigger message carries CAG membership information of the target cell; and the CAG membership information of the target cell includes at least one of an identifier of PLMN to which the target cell belongs, a CAG ID of the target cell, a membership status of the UE in the CAG to which the target cell belongs, and a cell access mode of the target cell.

In an implementation, the trigger message is further configured to instruct the target centralized network element to send a first NG interface message, which carries the CAG membership information of the target cell, to a core network, the first NG interface message includes at least one of a CAG membership verification request message, a PDU session modification indication message, a UE context modification indication message, a handover request message and a path switch request message.

In an implementation, sending the first NG interface message to the core network by the target centralized network element includes:

sending the first NG interface message to the core network by the target centralized network element before the target centralized network element sends the UE context setup request to the target distributed network element; or sending the first NG interface message to the core network by the target centralized network element after the target centralized network element sends the UE context setup request to the target distributed network element.

In an implementation, after the target centralized network element sends the first NG interface message to the core network, a second NG interface message, which is configured to instruct the core network to verify the CAG membership information of the target cell so as to obtain the membership status of the UE in the CAG to which the target cell belongs, is received, the second NG interface message includes at least one of a CAG membership verification response message, a PDU session modification acknowledgement message, a UE context modification acknowledgement message, a handover request message and a path switch request response message.

In an implementation, in the case where the membership status of the UE in the CAG to which the target cell belongs is used to indicate that the UE does not belong to the CAG membership corresponding to the target cell, a UE context modification request message is sent by the target centralized network element to the target distributed network element, with the UE context modification request message carrying at least one of:

a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

In an implementation, the cell access mode of the target cell is configured to indicate a type of the target cell, and the type of the target cell includes at least one of:

a hybrid CAG cell, a closed CAG cell and an open CAG cell.

In an implementation, the UE context setup request at least includes the CAG membership information of the target cell.

It should be noted that the above modules may be implemented by software or hardware. When by hardware, the modules may be implemented in the following ways: all the modules are located in the same processor, or the modules are randomly combined and located in different processors.

An embodiment of the present disclosure further provides a user processing device configured to implement the above embodiments and preferable embodiments, and what is described above will not be repeated here. The term "module" used below refers to software, hardware, or a combination of software and hardware that can perform predetermined functions. Although the device described in the following embodiment may be preferably implemented by software, the implementations of the device by hardware or a combination of software and hardware are possible and can be conceived.

Figure 15:
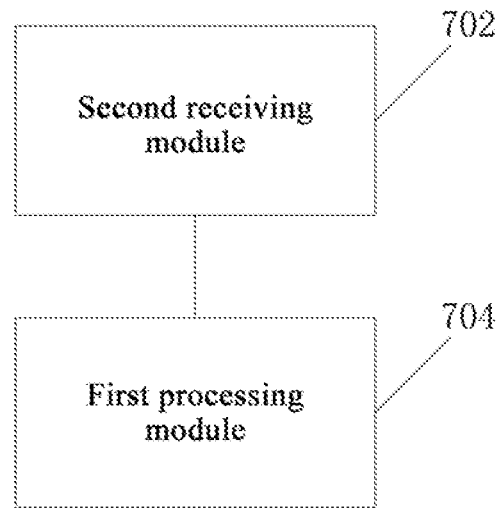
FIG. 15 is a block diagram of a user processing device according to an embodiment of the present disclosure.

FIG. 15 is a block diagram of a user processing device according to an embodiment of the present disclosure. As shown in FIG. 15, the device includes:

a second receiving module 702 configured to receive a UE context modification request message sent by a core network, with the UE context modification request message configured to indicate the expiration or update of CAG membership of a UE and carrying at least one of a CAG membership status of the UE and a cause value for the expiration or update of the CAG membership of the UE; and a first processing module 704 configured to process the UE according to the UE context modification request message.

With the device provided by the above embodiment, the base station can receive the UE context modification request message which is sent by the core network and configured to indicate the expiration or update of the CAG membership of the UE, and process the UE according to the UE context modification request message. Therefore, the device provided by the above embodiment can solve the problem in the related art that the core network cannot effectively verify the CAG membership of the user during a connection process between the base station adopting the architecture of separated centralized network element and distributed network element and the user, and thus produce an effect that the core network can effectively verify the CAG membership of the user.

In an implementation, the second receiving module 702 is configured to:

after receiving the UE context modification request message sent by the core network, send a UE context modification request message to a target distributed network element, with the UE context modification request message carrying at least one of the CAG membership status of the UE and the cause value for the expiration or update of the CAG membership of the UE.

In an implementation, processing the UE according to the UE context modification request message includes at least one of the following steps:

triggering a cell handover procedure by a centralized network element;

triggering a UE context release procedure by the centralized network element;

triggering the UE context release procedure by the target distributed network element;

triggering the UE context release procedure by the core network; and degrading the QoS of the UE by the core network.

In an implementation, the step of triggering the UE context release procedure by the centralized network element includes:

sending a UE context release request message by the centralized network element to the core network, with the UE context release request message carrying the cause value for the expiration or update of the CAG membership of the UE; or sending a UE context release command message by the centralized network element to the distributed network element, with the UE context release command message carrying the cause value for the expiration or update of the CAG membership of the UE.

In an implementation, the step of triggering the UE context release procedure by the target distributed network element includes:

receiving a UE context release request message from the target distributed network element by the centralized network element, with the UE context release request message carrying the cause value for the expiration or update of the CAG membership of the UE.

In an implementation, the step of triggering the UE context release procedure by the core network includes:

receiving a UE context release command message from the core network by the centralized network element, with the UE context release command message carrying the cause value for the expiration or update of the CAG membership of the UE.

In an implementation, after receiving the UE context release command message from the core network by the centralized network element, a UE context release command message is sent to the target distributed network element, with the UE context release command message carrying the cause value for the expiration or update of the CAG membership of the UE.

In an implementation, a third NG interface message is sent to the core network in the case where the UE is handed over from a CAG to another CAG cell, with the third NG interface message carrying an updated CAG ID of the UE.

In an implementation, the third NG interface message at least includes a location report message.

It should be noted that the above modules may be implemented by software or hardware. When by hardware, the modules may be implemented in the following ways: all the modules are located in a same processor, or the modules are randomly combined and located in different processors.

An embodiment of the present disclosure further provides a user processing device configured to implement the above embodiments and preferable embodiments, and what is described above will not be repeated here. The term "module" used below refers to software, hardware, or a combination of software and hardware that can perform predetermined functions. Although the device described in the following embodiment may be preferably implemented by software, the implementations of the device by hardware or a combination of software and hardware are possible and can be conceived.

Figure 16:
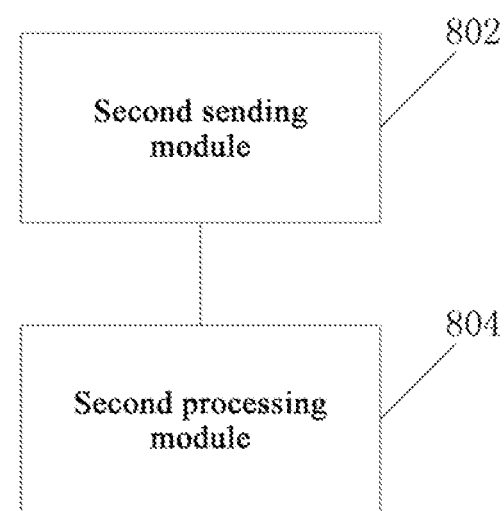
FIG. 16 is a block diagram of a user processing device according to an embodiment of the present disclosure.

FIG. 16 is a block diagram of a user processing device according to an embodiment of the present disclosure. As shown in FIG. 16, the device includes:

a second sending module 802 configured to send a UE context modification request message to a centralized network element, with the UE context modification request message configured to indicate the expiration or update of CAG membership of a UE and carrying at least one of a CAG membership status of the UE and a cause value for the expiration or update of the CAG membership of the UE; and a second processing module 804 configured to process the UE according to the UE context modification request message.

With the device provided by the above embodiment, the base station can receive the UE context modification request message which is sent by the core network and configured to indicate the expiration or update of the CAG membership of the UE, and process the UE according to the UE context modification request message. Therefore, the device provided by the above embodiment can solve the problem in the related art that the core network cannot effectively verify the CAG membership of the user during a connection process between the base station adopting the architecture of separated centralized network element and distributed network element and the user, and thus produce an effect that the core network can effectively verify the CAG membership of the user.

In an implementation, the second sending module 802 is configured to:

after sending the UE context modification request message to the centralized network element, send the UE context modification request message to a target distributed network element, with the UE context modification request message carrying at least one of the CAG membership status of the UE and the cause value for the expiration or update of the CAG membership of the UE.

In an implementation, processing the UE according to the UE context modification request message includes at least one of the following steps:

triggering a cell handover procedure by a centralized network element;

triggering a UE context release procedure by the centralized network element;

triggering the UE context release procedure by the target distributed network element;

triggering the UE context release procedure by the core network; and degrading the QoS of the UE by the core network.

In an implementation, the step of triggering the UE context release procedure by the centralized network element includes:

sending a UE context release request message by the centralized network element to the core network, with the UE context release request message carrying the cause value for the expiration or update of the CAG membership of the UE; or sending a UE context release command message by the centralized network element to the distributed network element, with the UE context release command message carrying the cause value for the expiration or update of the CAG membership of the UE.

In an implementation, the step of triggering the UE context release procedure by the target distributed network element includes:

receiving a UE context release request message from the target distributed network element by the centralized network element, with the UE context release request message carrying the cause value for the expiration or update of the CAG membership of the UE.

In an implementation, the step of triggering the UE context release procedure by the core network includes:

receiving a UE context release command message from the core network by the centralized network element, with the UE context release command message carrying the cause value for the expiration or update of the CAG membership of the UE.

In an implementation, after receiving the UE context release command message from the core network by the centralized network element, a UE context release command message is sent to the target distributed network element, with the UE context release command message carrying the cause value for the expiration or update of the CAG membership of the UE.

In an implementation, a third NG interface message is sent to the core network in the case where the UE is handed over from a CAG to another CAG cell, with the third NG interface message carrying an updated CAG ID of the UE.

In an implementation, the third NG interface message at least includes a location report message.

It should be noted that the above modules may be implemented by software or hardware. When by hardware, the modules may be implemented in the following ways: all the modules are located in the same processor, or the modules are randomly combined and located in different processors.

An embodiment of the present disclosure further provides a storage medium having a computer program stored therein, the computer program is configured to perform the steps in any one of the above method embodiments when being executed.

In the embodiment, the storage medium may be configured to store a computer program configured to perform the following steps:

S1, receiving a trigger message sent by a UE, and sending a UE context setup request, which is configured to instruct a target distributed network element to set up a UE context, to the target distributed network element in response to the trigger message; and S2, handing the UE over to a target cell corresponding to the target distributed network element according to the UE context.

In the embodiment, the above storage medium may include, but is not limited to, various medium capable of storing computer programs, such as a Universal Serial Bus Flash Disk (USB flash disk), an ROM, an RAM, a mobile hard disk, a magnetic disk and an optical disc.

An embodiment of the present disclosure further provides a storage medium having a computer program stored therein, the computer program is configured to perform the steps in any one of the above method embodiments when being executed.

In the embodiment, the storage medium may be configured to store a computer program configured to perform the following steps:

S1, sending a trigger message, which is configured to instruct a target centralized network element to send a UE context setup request to a target distributed network element, to the target centralized network element, with the UE context setup request configured to instruct the target distributed network element to set up a UE context; and S2, handing a UE over to a target cell corresponding to the target distributed network element according to the UE context.

In the embodiment, the above storage medium may include, but is not limited to, various medium capable of storing computer programs, such as a USB flash disk, an ROM, an RAM, a mobile hard disk, a magnetic disk and an optical disc.

An embodiment of the present disclosure further provides a storage medium having a computer program stored therein, the computer program is configured to perform the steps in any one of the above method embodiments when being executed.

In the embodiment, the storage medium may be configured to store a computer program configured to perform the following steps:

S1, receiving a UE context modification request message sent by a core network, with the UE context modification request message configured to indicate the expiration or update of CAG membership of a UE and carrying at least one of a CAG membership status of the UE and a cause value for the expiration or update of the CAG membership of the UE; and S2, processing the UE according to the UE context modification request message.

In the embodiment, the above storage medium may include, but is not limited to, various medium capable of storing computer programs, such as a USB flash disk, an ROM, an RAM, a mobile hard disk, a magnetic disk and an optical disc.

An embodiment of the present disclosure further provides a storage medium having a computer program stored therein, the computer program is configured to perform the steps in any one of the above method embodiments when being executed.

In the embodiment, the storage medium may be configured to store a computer program configured to perform the following steps:

S1, sending a UE context modification request message to a centralized network element, with the UE context modification request message configured to indicate the expiration or update of CAG membership of a UE and carrying at least one of a CAG membership status of the UE and a cause value for the expiration or update of the CAG membership of the UE; and S2, processing the UE according to the UE context modification request message.

In the embodiment, the above storage medium may include, but is not limited to, various medium capable of storing computer programs, such as a USB flash disk, an ROM, an RAM, a mobile hard disk, a magnetic disk and an optical disc.

An embodiment of the present disclosure further provides an electronic device, including a memory having a computer program stored therein, and a processor configured to run the computer program to perform the steps in any one of the above method embodiments.

The electronic device may further include a transmission device and an input/output device, both of which are connected to the processor.

In the embodiment, the processor may be configured to perform the following steps through the computer program:

S1, receiving a trigger message sent by a UE, and sending a UE context setup request, which is configured to instruct a target distributed network element to set up a UE context, to the target distributed network element in response to the trigger message; and S2, handing the UE over to a target cell corresponding to the target distributed network element according to the UE context.

Reference may be made to the examples described in the above embodiments and the above optionally embodiments for specific examples of this embodiment, and the specific examples of this embodiment are not repeated here.

An embodiment of the present disclosure further provides an electronic device, including a memory having a computer program stored therein, and a processor configured to run the computer program to perform the steps in any one of the above method embodiments.

The electronic device may further include a transmission device and an input/output device, both of which are connected to the processor.

In the embodiment, the processor may be configured to perform the following steps through the computer program:

S1, sending a trigger message, which is configured to instruct a target centralized network element to send a UE context setup request to a target distributed network element, to the target centralized network element, with the UE context setup request configured to instruct the target distributed network element to set up a UE context; and S2, handing a UE over to a target cell corresponding to the target distributed network element according to the UE context.

Reference may be made to the examples described in the above embodiments and the above optionally embodiments for specific examples of this embodiment, and the specific examples of this embodiment are not repeated here.

An embodiment of the present disclosure further provides an electronic device, including a memory having a computer program stored therein, and a processor configured to run the computer program to perform the steps in any one of the above method embodiments.

The electronic device may further include a transmission device and an input/output device, both of which are connected to the processor.

In the embodiment, the processor may be configured to perform the following steps through the computer program:

S1, receiving a UE context modification request message sent by a core network, with the UE context modification request message configured to indicate the expiration or update of CAG membership of a UE and carrying at least one of a CAG membership status of the UE and a cause value for the expiration or update of the CAG membership of the UE; and S2, processing the UE according to the UE context modification request message.

Reference may be made to the examples described in the above embodiments and the above optionally embodiments for specific examples of this embodiment, and the specific examples of this embodiment are not repeated here.

An embodiment of the present disclosure further provides an electronic device, including a memory having a computer program stored therein, and a processor configured to run the computer program to perform the steps in any one of the above method embodiments.

The electronic device may further include a transmission device and an input/output device, both of which are connected to the processor.

In the embodiment, the processor may be configured to perform the following steps through the computer program:

S1, sending a UE context modification request message to a centralized network element, with the UE context modification request message configured to indicate the expiration or update of CAG membership of a UE and carrying at least one of a CAG membership status of the UE and a cause value for the expiration or update of the CAG membership of the UE; and S2, processing the UE according to the UE context modification request message.

Reference may be made to the examples described in the above embodiments and the above optionally embodiments for specific examples of this embodiment, and the specific examples of this embodiment are not repeated here.

Apparently, it should be understood by those of ordinary skill in the art that all the modules or steps described above in the present disclosure may be implemented by a general-purpose computing device, may be integrated in a single computing device or distributed on a network composed of a plurality of computing devices. The modules or steps may be implemented by program codes executable by a computing device, such that the modules or steps can be stored in a storage device and executed by a computing device. In some cases, the steps illustrated or described may be performed in an order different from that described herein. The modules or steps may be separately made into integrated circuit modules, or some of the modules or steps may be made into a single integrated circuit module. Thus, the present disclosure is not limited to any specific combination of hardware and software.

The description above is merely of the exemplary embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the protection scope of the present disclosure.

What is claimed is:

1. A cell handover method applied to a centralized network element, comprising:
   receiving a trigger message sent by a User Equipment (UE), and sending a UE context setup request, which is configured to instruct a target distributed network element to set up a UE context, to the target distributed network element in response to the trigger message; and
   handing the UE over to a target cell corresponding to the target distributed network element according to the UE context,
   the method further comprising:
   after receiving the trigger message sent by the UE, sending a first next generation (NG) interface message to a core network; wherein, the first NG interface message carries Closed Access Group (CAG) membership information of the target cell; and
   the first NG interface message comprises at least one of a CAG membership verification request message, a Protocol Data Unit (PDU) session modification indication message, a UE context modification indication message, a handover request message and a path switch request message.

2. The method of claim 1, wherein the trigger message comprises at least one of:
   a measurement report reported by the UE, a handover request message sent by a core network, and a handover request message sent by a source base station.

3. The method of claim 1, wherein the trigger message carries the CAG membership information of the target cell; and
   the CAG membership information of the target cell comprises at least one of an identifier of Public Land Mobile Network (PLMN) to which the target cell belongs, a CAG ID of the target cell, a membership status of the UE in a CAG to which the target cell belongs, and a cell access mode of the target cell.

4. The method of claim 3,
   wherein the sending the first NG interface message to the core network comprises:
   sending the first NG interface message to the core network before the UE context setup request is sent to the target distributed network element in response to the trigger message; or
   sending the first NG interface message to the core network after the UE context setup request is sent to the target distributed network element in response to the trigger message.

5. The method of claim 3, further comprising:
   after sending the first NG interface message to the core network, receiving a second NG interface message, which is configured to instruct the core network to verify the CAG membership information of the target cell so as to obtain the membership status of the UE in the CAG to which the target cell belongs; wherein
   the second NG interface message comprises at least one of a CAG membership verification response message, a PDU session modification acknowledgement message, a UE context modification acknowledgement message, a handover request message and a path switch request response message, and
   the method further comprises:
   in response to that the membership status of the UE in the CAG to which the target cell belongs is used to indicate that the UE does not belong to CAG membership corresponding to the target cell, sending a UE context modification request message to the target distributed network element, wherein the UE context modification request message carries at least one of:
   a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

6. The method of claim 3, wherein the cell access mode of the target cell is configured to indicate a type of the target cell, and the type of the target cell comprises at least one of:
   a hybrid CAG cell, a closed CAG cell and an open CAG cell.

7. The method of claim 1, wherein the UE context setup request comprises the CAG membership information of the target cell.

8. A cell handover method applied to a user side, comprising:
   sending a trigger message to a target centralized network element, wherein the trigger message is configured to instruct the target centralized network element to send a UE context setup request to a target distributed network element, and the UE context setup request is configured to instruct the target distributed network element to set up a UE context; and
   handing a UE over to a target cell corresponding to the target distributed network element according to the UE context,
   wherein the trigger message is further configured to instruct the target centralized network element to send a first NG interface message, which carries CAG membership information of the target cell, to a core network; and
   the first NG interface message comprises at least one of a CAG membership verification request message, a PDU session modification indication message, a UE context modification indication message, a handover request message and a path switch request message.

9. The method according to claim 8, wherein the trigger message carries the CAG membership information of the target cell; and
   the CAG membership information of the target cell comprises at least one of an identifier of PLMN to which the target cell belongs, a CAG ID of the target cell, a membership status of the UE in a CAG to which the target cell belongs, and a cell access mode of the target cell.

10. The method of claim 9,
    wherein the sending the first NG interface message to the core network by the target centralized network element comprises:
    sending the first NG interface message to the core network by the target centralized network element before the target centralized network element sends the UE context setup request to the target distributed network element; or
    sending the first NG interface message to the core network by the target centralized network element after the target centralized network element sends the UE context setup request to the target distributed network element.

11. The method of claim 9, further comprising:
after the sending the first NG interface message to the core network by the target centralized network element, receiving a second NG interface message; wherein the second NG interface message is configured to instruct the core network to verify the CAG membership information of the target cell so as to obtain the membership status of the UE in the CAG to which the target cell belongs; and the second NG interface message comprises at least one of a CAG membership verification response message, a PDU session modification acknowledgement message, a UE context modification acknowledgement message, a handover request message and a path switch request response message, and the method further comprises:
in response to that the membership status of the UE in the CAG to which the target cell belongs is used to indicate that the UE does not belong to CAG membership corresponding to the target cell,
sending a UE context modification request message by the target centralized network element to the target distributed network element; wherein the UE context modification request message carries at least one of:
a CAG ID of the UE, the membership status of the UE in the CAG to which the target cell belongs, and a cause value for an inconsistency between a CAG membership status of the UE stored in the target centralized network element and the membership status of the UE in the CAG to which the target cell belongs.

12. A user processing method applied to a base station side, comprising:
receiving a UE context modification request message sent by a core network, wherein the UE context modification request message is configured to indicate expiration or update of CAG membership of a UE and carries at least one of a CAG membership status of the UE and a cause value for the expiration or update of the CAG membership of the UE; and
processing the UE according to the UE context modification request message.

13. The method of claim 12, further comprising:
after receiving the UE context modification request message sent by the core network, sending the UE context modification request message to a target distributed network element, wherein the UE context modification request message carries at least one of the CAG membership status of the UE and the cause value for the expiration or update of the CAG membership of the UE.

14. The method of claim 12, the processing the UE according to the UE context modification request message comprises at least one of the following steps:
triggering a cell handover procedure by a centralized network element;
triggering a UE context release procedure by the centralized network element;
triggering the UE context release procedure by a target distributed network element;
triggering the UE context release procedure by the core network; and
degrading Quality of Service of the UE by the core network, wherein the triggering the UE context release procedure by the centralized network element comprises:
sending a UE context release request message by the centralized network element to the core network, wherein the UE context release request message carries the cause value for the expiration or update of the CAG membership of the UE; or
sending a UE context release command message by the centralized network element to the distributed network element, wherein the UE context release command message carries the cause value for the expiration or update of the CAG membership of the UE,
wherein the triggering the UE context release procedure by the target distributed network element comprises:
receiving a UE context release request message from the target distributed network element by the centralized network element, wherein the UE context release request message carries the cause value for the expiration or update of the CAG membership of the UE,
wherein the triggering the UE context release procedure by the core network comprises:
receiving a UE context release command message from the core network by the centralized network element, wherein the UE context release command message carries the cause value for the expiration or update of the CAG membership of the UE, and
the method further comprises:
after receiving the UE context release command message from the core network by the centralized network element, sending the UE context release command message to the target distributed network element, wherein the UE context release command message carries the cause value for the expiration or update of the CAG membership of the UE.

15. The method of claim 12, further comprising:
sending a third NG interface message to the core network in response to that the UE is handed over from a CAG to another CAG cell; wherein the third NG interface message carries an updated CAG ID of the UE,
wherein the third NG interface message comprises a location report message.

16. A user processing method applied to a core network side, comprising:
sending a UE context modification request message to a centralized network element, wherein the UE context modification request message is configured to indicate expiration or update of CAG membership of a UE and carries at least one of a CAG membership status of the UE and a cause value for the expiration or update of the CAG membership of the UE; and
processing the UE according to the UE context modification request message.

17. A storage medium having a computer program stored therein, wherein the computer program is configured to, when being executed, perform the method of claim 1.

18. An electronic device, comprising a memory having a computer program stored therein, and a processor configured to run the computer program to perform the method of claim 1.

19. An electronic device, comprising a memory having a computer program stored therein, and a processor configured to run the computer program to perform the method of claim 8.

20. An electronic device, comprising a memory having a computer program stored therein, and a processor configured to run the computer program to perform the method of claim 12.

21. An electronic device, comprising a memory having a computer program stored therein, and a processor configured to run the computer program to perform the method of claim 16.

\* \* \* \* \*